United States Patent
Schultz et al.

(10) Patent No.: US 7,401,505 B1
(45) Date of Patent: Jul. 22, 2008

(54) LOW COST WIND TUNNEL FOR SUPERSONIC AND HYPERSONIC AEROTHERMAL TESTING

(75) Inventors: Ronald Schultz, Ridgecrest, CA (US); Warren Kendrick Jaul, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/653,478

(22) Filed: Jan. 9, 2007

(51) Int. Cl.
*G01M 9/00* (2006.01)
(52) U.S. Cl. .......................................... 73/147
(58) Field of Classification Search .................... 73/147
See application file for complete search history.

(56) References Cited

U.S. PATENT DOCUMENTS 3,744,305 A * 7/1973 Sabol et al. .................... 73/147
6,694,808 B2 * 2/2004 Sawada et al. ................ 73/147

* cited by examiner

*Primary Examiner*—Edward Lefkowitz
*Assistant Examiner*—Jermaine Jenkins
(74) *Attorney, Agent, or Firm*—Brian F. Drazich; John Bacoch

(57) ABSTRACT

The invention disclosed herein provides a subsonic wind tunnel capable for accurately maintaining a desired Mach number, pressure and temperature for use in aerothermal testing of materials. The invention allows the Mach number to be precisely controlled in the test section of the wind tunnel by employing a restricted outlet acting as a sonic throat for the wind tunnel. In the preferred embodiment, the restricted outlet is constructed to be variable in cross sectional area allowing a range of Mach numbers to be tested. The variable outlet is varied during the operation of the wind tunnel so that an actual trajectory with changing Mach numbers, pressure, and temperature is simulated.

10 Claims, 6 Drawing Sheets

LOW COST WIND TUNNEL FOR SUPERSONIC AND HYPERSONIC AEROTHERMAL TESTING

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

BACKGROUND OF THE INVENTION

1. Field of the Invention

The present invention relates to a wind tunnel testing apparatus and methods for use in aerothermal testing, and more particularly to such materials and methods utilizing a low velocity subsonic flow with shear and heat flux conditions equivalent to a hypersonic or supersonic flight path of a test object.

2. Description of the Prior Art

The use of wind tunnels for simulating flight conditions is a common practice in the aerospace industry. Utilizing wind tunnels, objects are subjected to carefully controlled environmental conditions and monitored to determine how the object behaves. All wind tunnels operate under the same basic principle. A gas is accelerated to a desired velocity with a test object located within the gas stream. The conditions in the wind tunnel are controlled for a variety of parameters such as pressure, temperature, and velocity.

Wind tunnels are typically categorized depending on the speed of the gas flow that they produce. The gas speed is characterized by a Mach number, which is the speed of the gas divided by the speed of sound in the gas. Wind tunnels are generally divided into one of four categories depending on the Mach number of the gas flow: subsonic, transonic, supersonic, and hypersonic. Subsonic wind tunnels are the simplest of the four and are relatively inexpensive. They accelerate a gas to a speed less than that of sound, usually up to Mach 0.6. Increasing in complexity, but still relatively simple are transonic wind tunnels that provide for gas flows near the speed of sound, from Mach 0.6 up to Mach 0.9. Supersonic wind tunnels accelerate the gas beyond the speed of sound, over Mach 1, and hypersonic wind tunnels accelerate the gas to well beyond Mach 2. As the required gas velocity increases, the wind tunnel becomes increasingly more expensive to build and operate.

Traditionally, an object to be tested is subjected to environmental conditions that are similar to the environmental conditions the object will experience in normal operation. In most applications, this requires that the gas in the wind tunnel be heated and accelerated to a significant fraction of the flight speed of the test object. Additionally, to simulate high altitude conditions, the ambient pressure in the wind tunnel may need to be reduced.

Using present technology to test materials for a missile designed to fly at Mach 6 would require the test gas to be heated to 2500 F and the gas to be accelerated to 6 times the speed of sound. This has several drawbacks. First, in order to accelerate the gas to such a high velocity, a converging-diverging nozzle must be used. A converging-diverging nozzle is a nozzle that accelerates the flow of subsonic gas to the speed of sound as it converges at the throat, or minimum diameter of the nozzle, and then, as the nozzle diverges, the gas is further accelerated to supersonic and hypersonic speeds. Such nozzles are expensive to build and a separate nozzle is required for each Mach number of interest. The nozzle must be as large as, if not larger, than the object to be tested. In addition to being expensive to build, massive amounts of gas must be available to supply the high mass flow rates encountered with such a large nozzle. Finally, the nozzles themselves must be kept cool, thus requiring large cooling systems. These limitations restrict the practical size of the nozzle commonly resulting in use of a nozzle that is undersized for a given application.

Aerothermal testing examines how a material responds to conditions of high temperatures and viscous shear forces. In applications that are not shear sensitive, matching the heat flux to that expected under operational flight conditions is sufficient. Testing other materials, such as ablators, requires that both the heat flux and shear force must be simultaneously matched. The parameters that primarily contribute to the heat flux and shear force are the pressure, temperature, and Mach number of the gas to which the test object is subjected. For any given point on a high-speed flight trajectory, an equivalent subsonic flow condition having a different pressure and temperature exists that will provide matching heat flux and shear conditions. The required values of pressure, temperature, and Mach number are calculated using conventional methods such as standard closed-form empirical boundary layer approximations, computational fluid dynamics, or other computational programs such as ATAC available from ITT Aerotherm.

Prior attempts at simulating high-speed aerothermal conditions with a subsonic test section relied on a diffuser from which the test gas exited directly into atmospheric pressure or into a controlled pressure environment. With this arrangement, it was not possible to control the test section pressure or Mach number and hence it was only possible to simulate the heat flux over the test article. Other problems were encountered due to a mismatch between the required mass flow and the scale of the diffuser and resulted in a non-uniform flow condition over the test article.

SUMMARY OF THE INVENTION

The present invention solves the problem of having to accelerate a hot gas to supersonic or hypersonic speeds to accurately perform aerothermal testing upon a test object under conditions simulating supersonic or hypersonic flight. The present invention permits a subsonic condition to be utilized to match the shear and heat flux that would occur during a supersonic or hypersonic flight trajectory. The Mach number, pressure, and temperature in the wind tunnel are all easily controllable to match a predetermined heat flux and shear.

The invention permits larger items to be tested in a given wind tunnel because lower mass flow rates are required. Utilizing the present invention, the mass flow rates required to test the object are greatly reduced as compared to a hypersonic wind tunnel. For an equivalent mass flow rate, the present invention affords the use of a larger test section allowing for testing of larger objects than would otherwise be the case.

A feature of the present invention is that the static pressure surrounding the test article need not be reduced to simulate high altitude, low-pressure flight. Rather, the operating pressure may be chosen initially and then equivalent subsonic conditions determined to match that pressure. It is beneficial to be able to choose the operating pressure because as the operating pressure is increased, the Mach number required for the equivalent subsonic condition decreases.

The invention additionally permits the Mach number in the test section to be varied during operation of the wind tunnel. Conventional technology typically is limited to testing at a single condition. An accurate simulation of a complete trajectory requires conditions that change in time to match those experienced in flight. The present invention allows the heat flux and shear to be varied in time to accurately simulate the complete trajectory of a test article.

DESCRIPTION OF THE PREFERRED EMBODIMENTS

Figure 1:
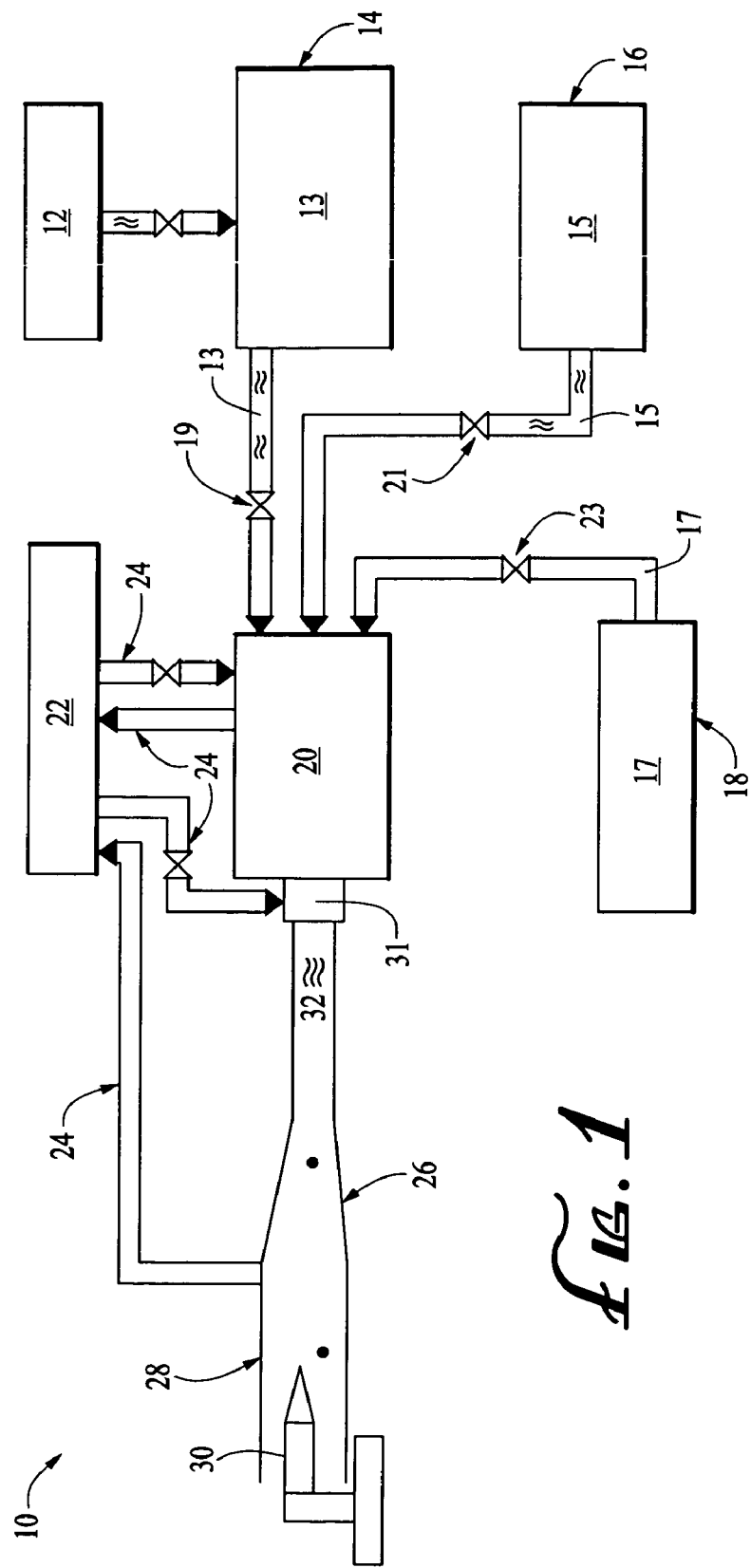
FIG. 1 is a general block diagram of a subsonic wind tunnel facility.
Figure 2:
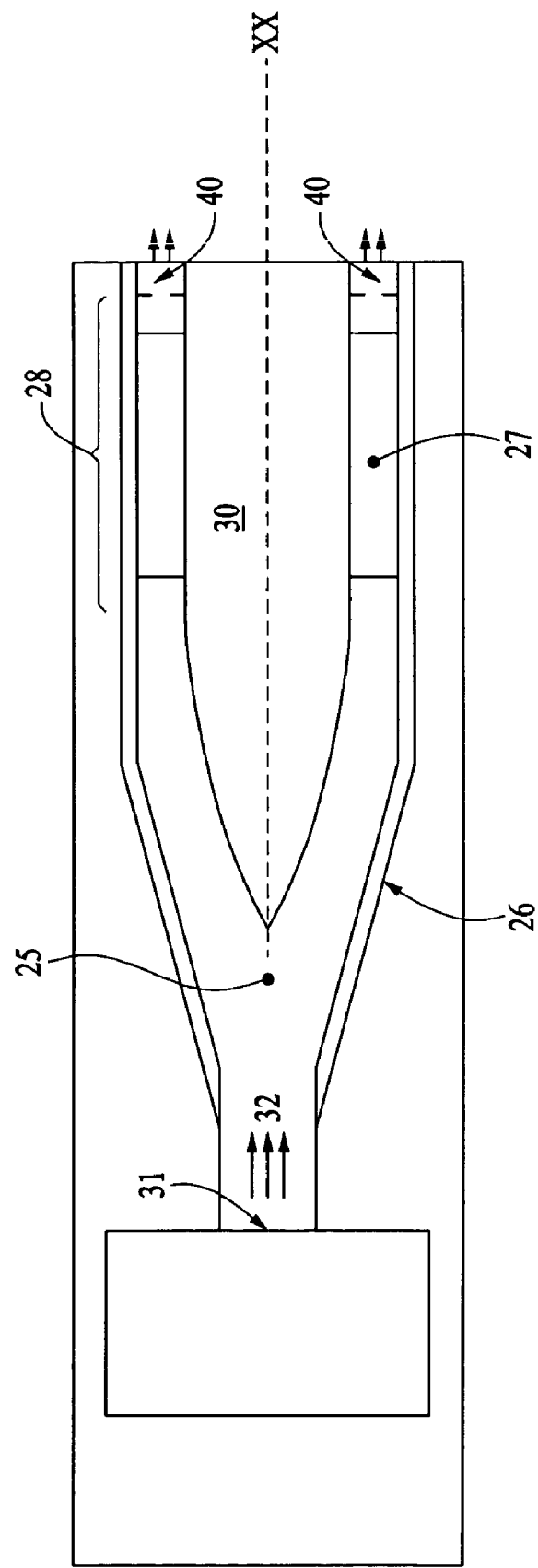
FIG. 2 is a schematic of a subsonic diffuser and test section fitted with a restricted area outlet throat.

Referring to FIGS. 1 & 2, subsonic wind tunnel 10 is described. Air compressor 12 provides compressed air 13 to compressed air storage tank 14. Compressed air storage tank 14 delivers compressed air 13 to sudden expansion air heater 20 where compressed air 13 is mixed with fuel 15 such as propane supplied by fuel storage tank 16. It will be understood that other conventional sources of compressed air, such as fans, turbines and the like may also be used to supply compressed air. Hydrogen 17 is optionally added to the fuel air mixture to enhance ignition of the fuel air mixture. Alternatively, compressed air 13 is heated using other conventional methods such as a vitiated air heater, arc jet, or pebble bed heater to produce heated gas 32. Pressurized water supply 22 cools wind tunnel 10 and helps regulate the temperature of the wind tunnel components. Heated gas 32 flows through flow straightener 31 and into diffuser lumen 25 of subsonic diffuser 26. Subsonic diffuser 26 is coupled to test section 28 having test section lumen 27 therethrough that is adapted to hold test object 30. Heated gas 32 flows through test section lumen 27, around test object 30 and out the outlet throat 40 of test section 28.

Air compressor 12 delivers compressed air 13 at high pressure to be stored within compressed air storage 14. Compressed air storage 14 provides a continuous supply of compressed air 13 at a mass flow rate that is capable of exceeding the output capacity of air compressor 12. The total amount of compressed air 13 available in compressed air storage 14 is typically the limiting factor in the duration of operation of wind tunnel 10. Compressed air storage 14 is connected or coupled to sudden expansion air heater 20 through air control valve 19 that allows the mass flow rate of compressed air 13 to be controlled.

Fuel storage 16 is connected or coupled to sudden expansion air heater 20 through fuel control valve 21 which regulates the mass flow rate of fuel 15 delivered to sudden air expansion heater 20. Combustion of fuel 15 and compressed air 13 is optionally facilitated by the introduction of hydrogen 17 provided by hydrogen storage 18. Once the fuel air mixture is ignited, hydrogen 17 is turned off at hydrogen control valve 23. The combustion of compressed air 13 and fuel 15 produces heated gas 32. The mass flow rate of fuel 15 determines the amount of heat added to wind tunnel 10 and is easily adjusted using fuel control valve 21.

Water lines 24 conduct water from pressurized water supply 22 to sudden expansion air heater 20 to provide for cooling. The water helps to keep wind tunnel 10 from overheating and is additionally used to control the operating temperature of the wind tunnel components.

In operation, the mixture of the three gases is ignited within sudden expansion air heater 20. The total mass flow rate of the resulting heated gas 32 is controlled using control valves 19 and 21 from compressed air storage 14 and fuel storage 16, respectively. The temperature of heated gas 32 is regulated by adjusting the mass flow rate of fuel 15 entering air heater 20. The mass flow rate of fuel 15 is controlled utilizing feedback from a gas temperature sensor preferably disposed in test section lumen 27. Heated gas 32 is thoroughly mixed within sudden expansion gas heater 20 before exiting. Heated gas 32 exiting sudden expansion air heater 20 flows into flow straightener 31 providing a more uniform and less turbulent flow.

Heated gas 32 flows through flow straightener 31 and into subsonic diffuser lumen 25. Proceeding along the direction of gas flow, the cross sectional area of subsonic diffuser lumen 25 gradually increases from the initial cross section at its coupling or juncture with flow straightener 31 until the cross section of subsonic diffuser lumen 25 matches the cross section of test section lumen 27 at the coupling or juncture of subsonic diffuser lumen 25 and test section lumen 27. As heated gas 32 flows through subsonic diffuser lumen 25 its Mach number decreases and its pressure increases.

The larger end of diffuser lumen 25 opposite flow straightener 31 opens into and is coupled to test section lumen 27 located within test section 28 of wind tunnel 10. Test section lumen 27 is generally cylindrical in shape with the opening from diffuser lumen 25 on one end and an outlet opening located at the opposite end. Test section lumen 27 is adapted to removably retain test object 30. Test object 30 has an object test region 36 that is generally cylindrical in shape. The center longitudinal axis YY of test object 30 is aligned with center longitudinal axis ZZ of test section lumen 27 so that the distance from the surface of cylindrical test object 30 to the walls of test section lumen 27 preferably is constant circumferentially. The cross sectional area of the resulting test section lumen 27 space located between the inner wall of test section 28 and the outer surface of test object 30 is constant over the longitudinal extent of object test section 36.

Figure 3:
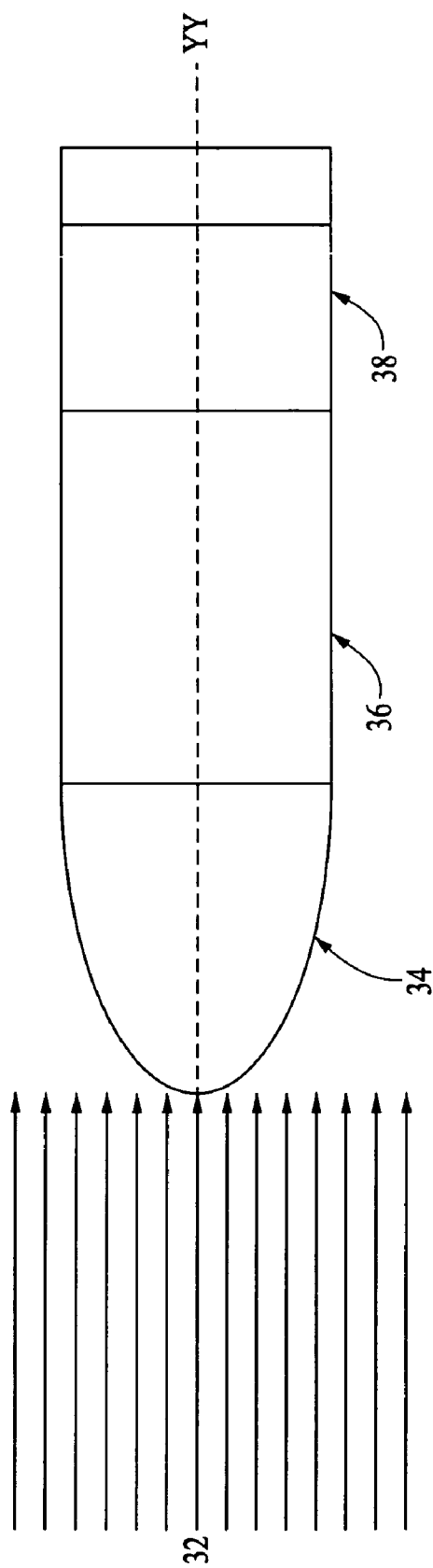
FIG. 3 is a detailed schematic of a test item.

FIG. 3 depicts a representative test object 30 detailing three regions of test object 30. The region of test object 30 first encountered by hot gas flow 32 is nose region 34. Nose region 34 is water cooled to prevent overheating and to minimize influencing the measurements taken within object test region 36. Object test region 36 is the area where materials are actually tested. In a typical representative example, a material to be tested is applied or disposed circumferentially in this region of test object 30. Behind or downstream of test region 36 is aft region 38, which, like nose region 34, is cooled to prevent overheating and to minimize influencing the measurements taken within object test region 36.

Disposed in and coupled to test section lumen 27 is a variable area outlet throat 40 having a cross sectional area that is smaller than the cross sectional area of any gas fillable region (i.e., that region not occupied by test articles and related apparatus) within wind tunnel 10 and downstream of sudden expansion air heater 20. The variable area outlet throat 40 provides a restricted opening available for gases to exit from wind tunnel 10.

Figure 4:
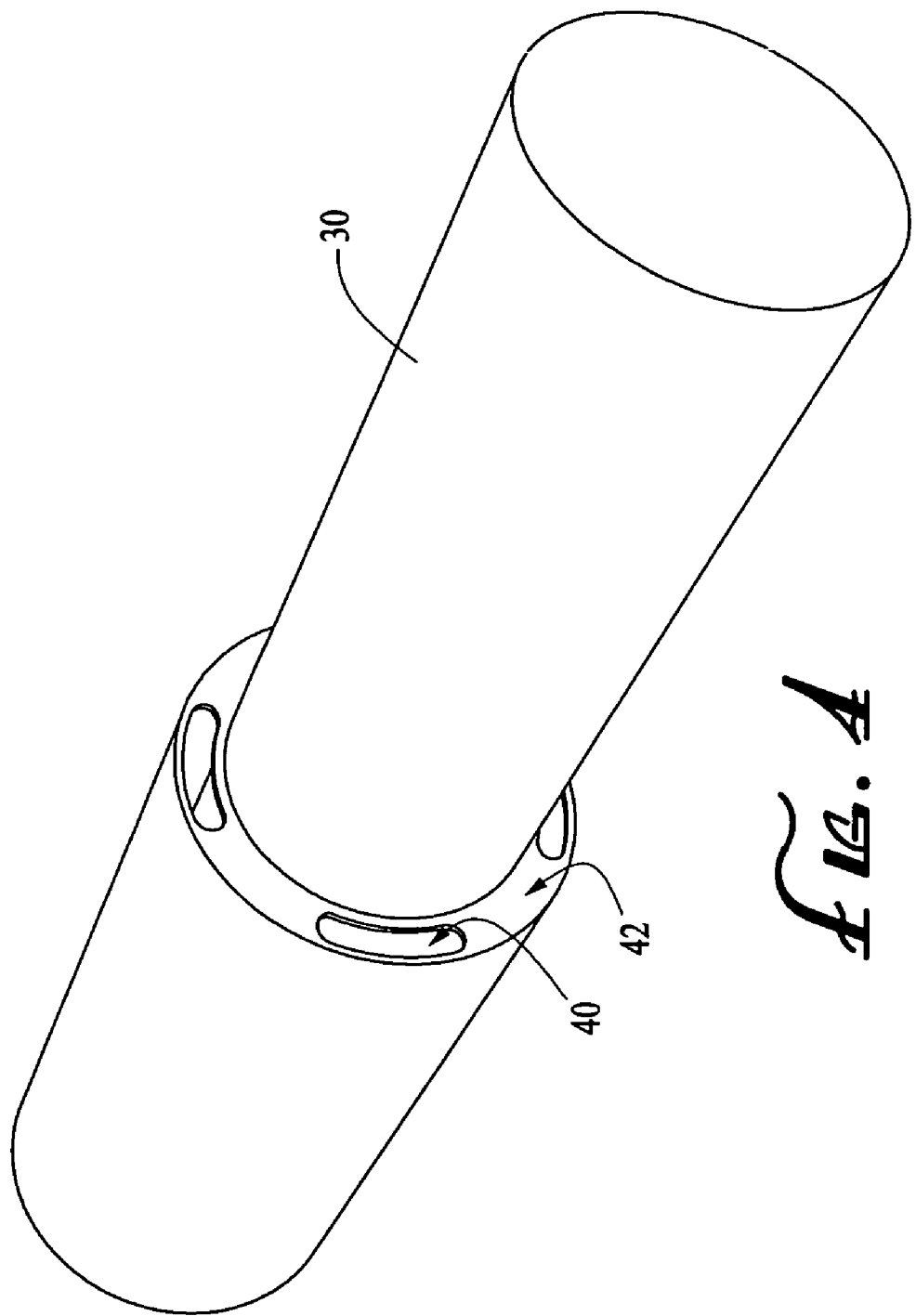
FIG. 4 is a view of a variable area outlet throat in a substantially open position.
Figure 5:
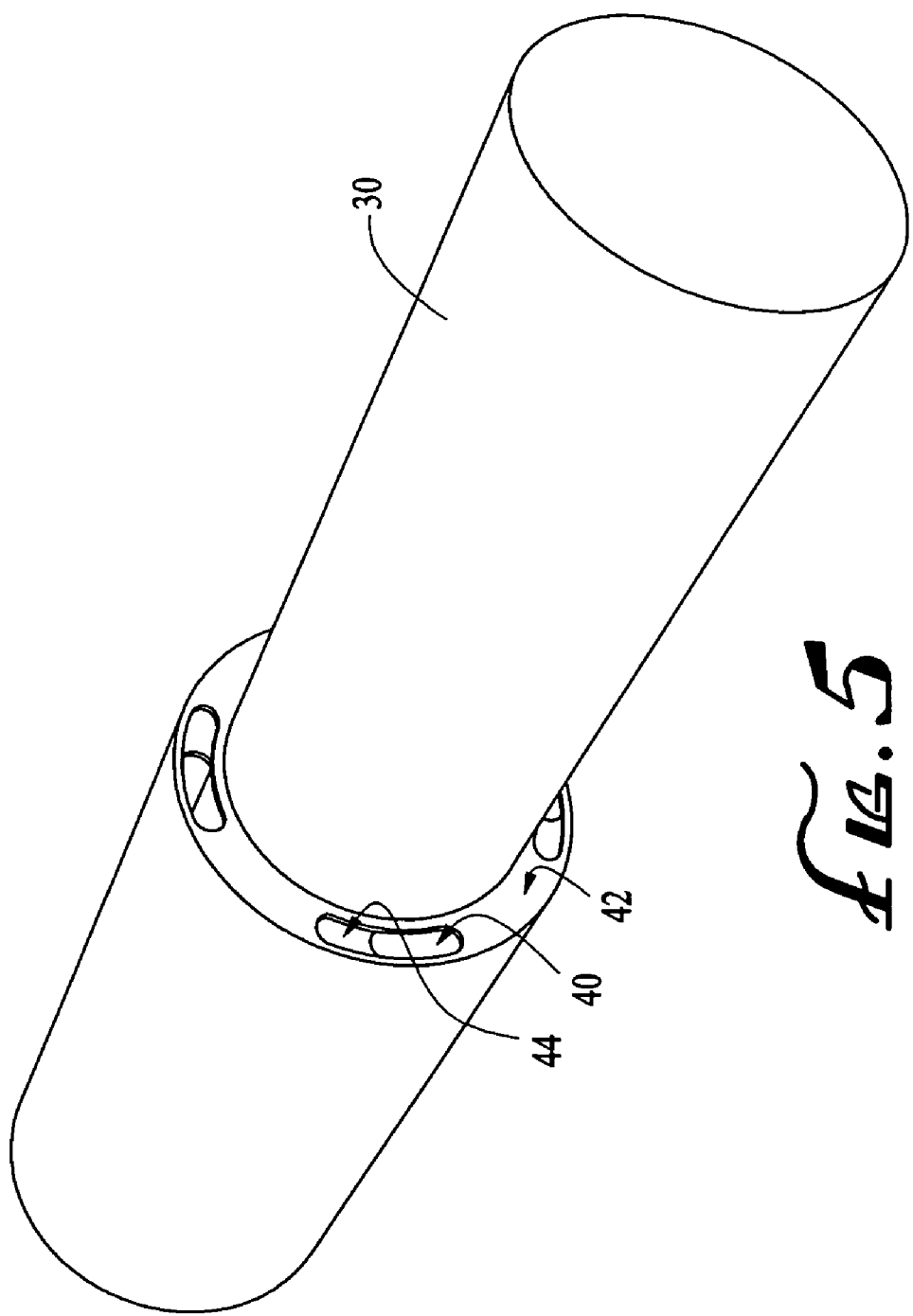
FIG. 5 is a view of a variable area outlet throat in a partially restricted position.
Figure 6:
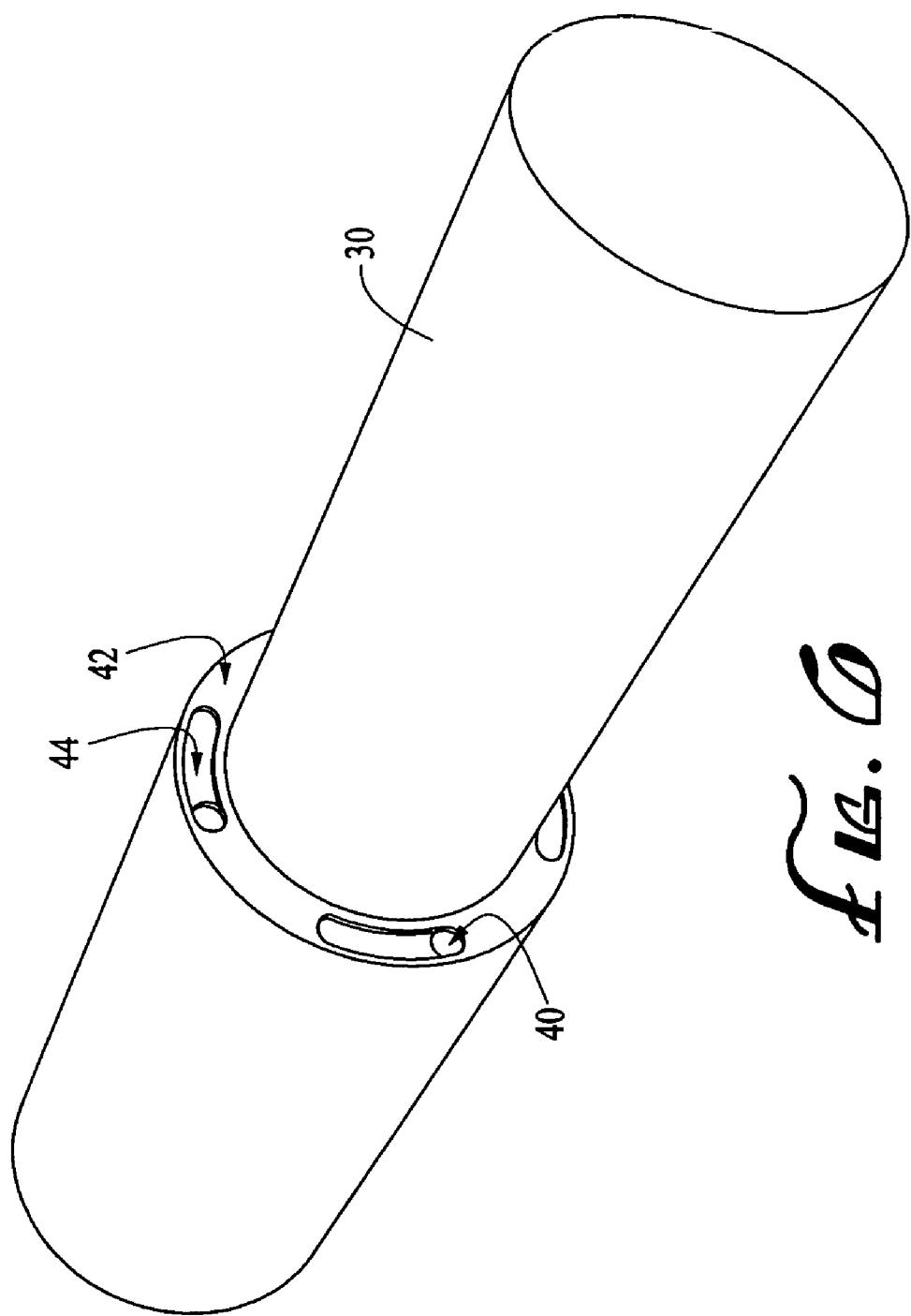
FIG. 6 is a view of a variable area outlet throat in a substantially restricted position.

FIGS. 4, 5, and 6 depict a representative example of a variable area outlet throat 40. The variable area outlet throat 40 is formed by proximal plate 42 and a distal plate 44. Plates 42 and 44 are flush with each other and axially aligned with the test section lumen 27. Proximal plate 42 is coupled to the test section 28. Distal plate 44 is coupled to the test section 28 but allowed to rotate freely around the longitudinal axis YY test object 30. Plates 42 and 44 have circumferentially aligned passages allowing fluid to flow therethrough. FIG. 4 depicts outlet throat in a substantially open position. The passages of plates 42 and 44 are aligned, and outlet throat 40 area is equal to the size of the passages. FIG. 5 depicts outlet throat 40 in a partially restricted position. In the partially restricted position, distal plate 44 has been rotated so that the passages are no longer aligned. The resulting outlet throat 40 is now the passage formed by the overlapping area of passages through plates 42 and 44. FIG. 6 depicts outlet throat in a substantially restricted position. In the substantially restricted position, distal plate 44 has been further rotated until there is almost no overlap between plates 42 and 44. The outlet throat 40 area is calibrated to provide a determined cross sectional area for a given rotation of the distal plate 44.

At low mass flow rates of heated gas 32, the flow will be subsonic through outlet throat 40. As heated gas 32 mass flow rate is increased, heated gas 32 Mach number in outlet throat 40 will increase until the Mach number of heated gas 32 reaches one. Further increases of heated gas 32 mass flow rate have no effect on heated gas 32 Mach number in outlet throat 40 because the flow is choked by a sonic throat formed by heated gas 32 in outlet throat 40.

So long as the heated gas 32 mass flow rate is at or above the rate resulting in choked flow of heated gas 32 within outlet throat 40, the cross sectional area of outlet throat 40 controls the Mach number of heated gas 32 flowing through test section lumen 27. The Mach number of heated gas 32 flowing through test section lumen 27 is a function of the ratio of the cross sectional areas of outlet throat 40 and of the gas fillable region of test section lumen 27. Reference to an accepted compressible subsonic flow table available in most fluid dynamics references will supply the corresponding Mach numbers for each cross sectional area ratio. The Mach number of heated gas 32 flowing in test section lumen 27 and through outlet throat 40 is independent of gas pressure or temperature. Rather, the Mach number of heated gas 32 depends solely upon the ratio of the cross sectional areas of test section lumen 27 and outlet throat 40.

Wind tunnel 10 is designed to test the aerothermal properties of a material applied to test region 36 of test object 30. The aerothermal properties of interest are the shear and heat flux experienced during flight conditions. These properties are primarily dependent upon the Mach number, the pressure and the temperature of the gas flowing past the material. The heat flux and shear experienced during flight is measured and recorded or the values are calculated using common computational techniques.

For each supersonic or hypersonic flight condition to be tested, a corresponding subsonic condition exists that will result in an equivalent shear and heat flux.

As has been described, the present invention provides for simple selection and regulation of the temperature, Mach number, and pressure of heated gas 32 flowing through test section lumen 27. The Mach number of heated gas 32 flowing in test section lumen 27 is controlled by varying the cross sectional area of outlet throat 40. Alternatively, the Mach number within test section lumen 27 is monitored, while the size of the cross section of outlet throat 40 is varied, until the desired heated gas 32 Mach number is obtained. Using either method, once the heated gas 32 Mach number to be used for a test is selected by adjusting the cross sectional area of outlet throat 40, the Mach number of heated gas 32 flowing through test section lumen 28 will remain constant regardless of fluctuations in gas temperature, gas pressure, or gas mass flow. The temperature of heated gas 32 in wind tunnel 10 is adjusted by changing the amount of heat entering the wind tunnel 10. This is controlled by adjusting the amount of fuel 15 that is introduced into sudden expansion air heater 20. It is possible to precalculate the rate of fuel consumption required to give a certain chosen temperature, or the rate is adjusted empirically until the desired temperature is realized.

The gas pressure in test section lumen 27 is controlled by adjusting the mass flow rate of heated gas 32 entering wind tunnel. Each of the three gases (compressed air 13, fuel 15, and hydrogen 17) is individually controlled for mass flow rate and the total mass flow rate is the combined mass flow rates of all three. Because hydrogen 17 contributes a negligible amount to the overall mass flow rate, only fuel 15 and compressed air 13 need be considered. The standard equation of state readily provides a total mass flow that will result in the desired pressure in test section lumen 27.

In operation, wind tunnel 10 provides heated gas 32 flow at a controlled Mach number, pressure, and temperature to test a material under conditions simulating those of a trajectory flown by a vehicle that may incorporate the material. This is accomplished by varying the cross sectional area of variable area outlet throat 40 in real time during a test. As the area of outlet throat 40 is varied, the Mach number and pressure of heated gas 32 in test section lumen 27 will change. The mass flow rate of heated gas 32 entering system 10 is adjusted independently of, or together with variable area outlet throat 40 to maintain or to vary the pressure in a desired profile. The temperature of heated gas 32 is varied to match a desired profile at the same time.

While the present invention has been described in connection with what are currently considered to be the most practical and preferred embodiments, it is to be understood that the invention is not to be limited to the disclosed embodiments, but to the contrary, is intended to cover various modifications, embodiments, and equivalent processes included within the spirit of the invention as may be suggested by the teaching herein, which are set forth in the appended claims, and which scope is to be accorded the broadest interpretation so as to encompass all such modification, embodiments, and equivalent processes.

What is claimed is:

1. A subsonic wind tunnel comprising:
    a gas generator adapted to produce a gas flow at a selected mass flow rate and temperature;
    a wind tunnel test section having an inlet opening and an outlet opening in fluid communication with said gas generator, whereby said gas flow enters said inlet opening, passes through said wind tunnel test section and exits said outlet opening;
    said wind tunnel test section adapted to hold a test article;
    said outlet opening having an outlet opening area selected to provide a selected Mach number of said gas flow through the test section; and,
    said outlet throat is variable in area during operation of the wind tunnel to provide for varying the Mach number of said gas flow through said test section over a predetermined range of Mach numbers during operation.

2. A subsonic wind tunnel comprising:
    a gas generator adapted to produce a gas flow at a selected mass flow rate and temperature;
    a wind tunnel test section having an inlet opening and an outlet opening in fluid communication with said gas generators whereby said gas flow enters said inlet opening, passes through said wind tunnel test section, and exits said outlet opening;

said wind tunnel test section adapted to hold a test article;
said outlet opening having an outlet opening area selected to provide a selected Mach number of said gas flow through the test section;
said outlet throat is variable in area during operation of the wind tunnel to provide for varying the Mach number of said gas flow through said test section over a predetermined range of Mach numbers during operation; and,
said mass flow rate and said outlet throat area are independently variable to provide independent selection of pressure and gas flow Mach number in the test section.

3. A subsonic wind tunnel comprising:
a gas generator adapted to produce a subsonic gas flow at a controlled mass flow rate;
a heating section in fluid communication with the gas generator adapted to heat said gas flow to a selected temperature;
a subsonic diffuser in fluid communication with said heating section;
a test section having an inlet opening and an outlet throat in fluid communication with the subsonic diffuser and said gas flow enters said test section through said inlet opening and exits said outlet throat;
said outlet throat having a restricted cross-sectional area selected to provide a predetermined Mach number of said gas flow in said test section;
said wind tunnel test section adapted to hold a test object; and,
said outlet throat is variable in area during wind tunnel operation to change the Mach number in said test section during operation.

4. A subsonic wind tunnel comprising:
a gas generator adapted to produce a subsonic gas flow at a controlled mass flow rate;
a heating section in fluid communication with the gas generator adapted to heat said gas flow to a selected temperature;
a subsonic diffuser in fluid communication with said heating section;
a test section having an inlet opening and an outlet throat in fluid communication with the subsonic diffuser and said gas flow enters said test section through said inlet opening and exits said outlet throat;
said outlet throat having a restricted cross-sectional area selected to provide a predetermined Mach number of said gas flow in said test section;
said wind tunnel test section adapted to hold a test object;
said outlet throat is variable in area during wind tunnel operation to change the Mach number in said test section during operation; and,
said mass flow rate and said outlet throat area are independently variable to provide independent selection of pressure and gas flow Mach number.

5. A subsonic wind tunnel comprising:
a gas generator adapted to produce a subsonic, heated gas flow through said wind tunnel;
said gas generator including a compressed air storage facility for the storage of compressed air for use in the wind tunnel, a compressed air control valve coupled to and in fluid communication with said compressed air storage facility adapted to control the mass flow rate of said compressed air, a heating fluid storage facility for the storage of a heating fluid, a heating fluid control valve coupled to and in fluid communication with said heating fluid storage facility adapted to control the mass flow rate of said heating fluid, and a heating section coupled to and in fluid communication with said air control valve and said heating fluid control valve adapted to heat said compressed air through combustion with said heating fluid creating a high temperature gas flow;
a subsonic diffuser coupled to and in fluid communication with said gas generator;
a cylindrical test section having an inlet, an opposite outlet throat, a longitudinal axis, and a hollow central lumen extending between said inlet opening and said outlet throat;
said test section coupled to and in fluid communication with said subsonic diffuser;
said test section adapted to contain and removably retain a test object in predetermined alignment with respect to said central longitudinal axis;
said outlet throat having a predetermined cross-sectional area selected to form a sonic throat for setting the Mach number of said heated gas flow within said test section.

6. The wind tunnel of claim 5 wherein said outlet throat is variable in area to provide for selecting a Mach number from a predetermined range of Mach numbers of said gas flow through said test section.

7. The wind tunnel of claim 5 wherein said outlet throat is variable in area during wind tunnel operation to change the Mach number in said test section during operation.

8. The wind tunnel of claim 5 wherein said gas generator is adapted to provide a variable mass flow rate that may be varied during operation of the wind tunnel.

9. The wind tunnel of claim 5 wherein said mass flow rate and said outlet throat area are independently variable to provide independent selection of pressure and gas flow Mach number in the test section.

10. A method for simulating selected supersonic flight parameters in a subsonic wind tunnel comprising:
determining the supersonic flight heat flux and shear stress values to be simulated;
providing a test object;
calculating for said test object the subsonic Mach number, gas pressure and gas temperature required to provide the heat flux and shear stress values to be simulated;
determining the ratio of wind tunnel test section cross sectional area to wind tunnel exit opening cross sectional area that will provide said required subsonic Mach number;
selecting the cross sectional area of the wind tunnel test section exit opening and the minimum cross sectional area of the test section lumen opening, not occupied by the test object, to have a ratio that will provide said required subsonic Mach number;
calculating a mass flow rate of gas that will provide the required gas pressure for said minimum test section lumen opening and exit opening cross sectional areas, said required subsonic Mach number, and said required gas temperature;
setting a wind tunnel gas generator and a wind tunnel gas heater to provide a gas temperature sufficient for the heat flux values to be simulated;
operating said subsonic wind tunnel, with said test object disposed in said test section, at said required subsonic Mach number, required gas temperature, and required gas pressure to simulate the heat flux and shear stress values of the selected supersonic flight conditions.

* * * * *